United States Patent

[11] 3,592,287

| [72] | Inventor | John C. Mollere<br>San Marino, Calif. |
|---|---|---|
| [21] | Appl. No. | 814,022 |
| [22] | Filed | Apr. 7, 1969 |
| [45] | Patented | July 13, 1971 |
| [73] | Assignee | Western Geophysical Company of America<br>Houston, Tex. |

[54] EXHAUST VALVE SYSTEM FOR SEISMIC GAS EXPLODER APPARATUS
16 Claims, 5 Drawing Figs.

[52] U.S. Cl. .................................................. 181/.5, 60/32
[51] Int. Cl. ............................................... G01v 1/04
[50] Field of Search ................................ 181/.5 NC; 60/32

[56] References Cited
UNITED STATES PATENTS

| 2,154,322 | 4/1939 | Cecil | 60/32 |
| 2,806,347 | 9/1957 | Pertile | 60/32 UX |
| 2,830,435 | 4/1958 | Mallory | 60/32 X |
| 3,176,787 | 4/1965 | Roever | 181/.5 NC |
| 3,480,101 | 11/1969 | Barry et al. | 181/.5 NC |

*Primary Examiner*—Rodney D. Bennett, Jr.
*Assistant Examiner*—Brian L. Ribando
*Attorneys*—Michael P. Breston, Alan C. Rose and Alfred E. Levine

ABSTRACT: A seismic gas exploder having a combustion chamber for receiving a mixture of combustible gases and a remotely positioned vacuum chamber coupled to the combustion chamber. A remotely controllable, pilot-operated exhaust valve allows the products of combustion to purge into the vacuum chamber through the exhaust valve thereby achieving substantially greater efficiency and uniformity of operation. The pilot-operated exhaust valve is operated from a gas source forming part of the exploder fuel system.

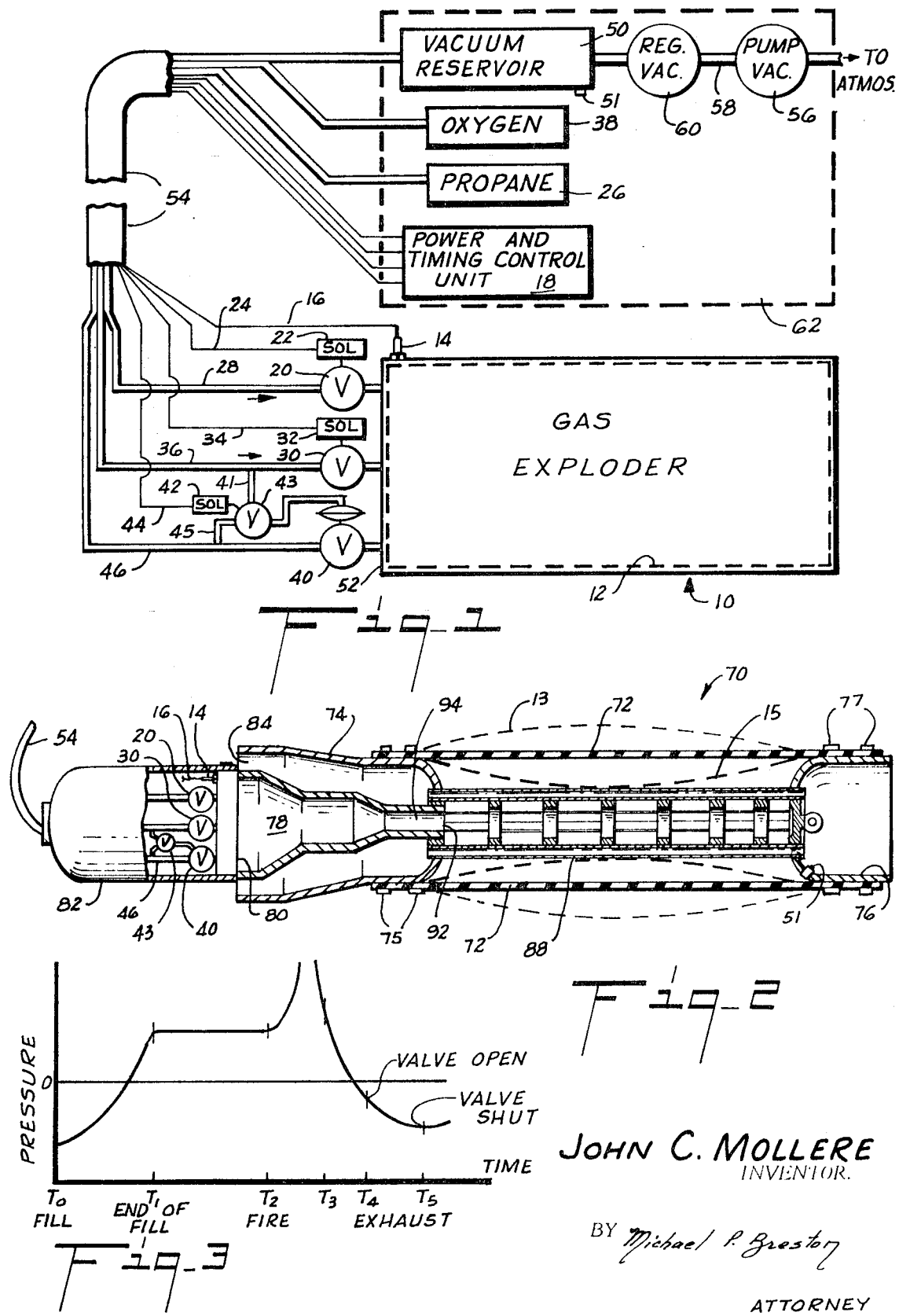

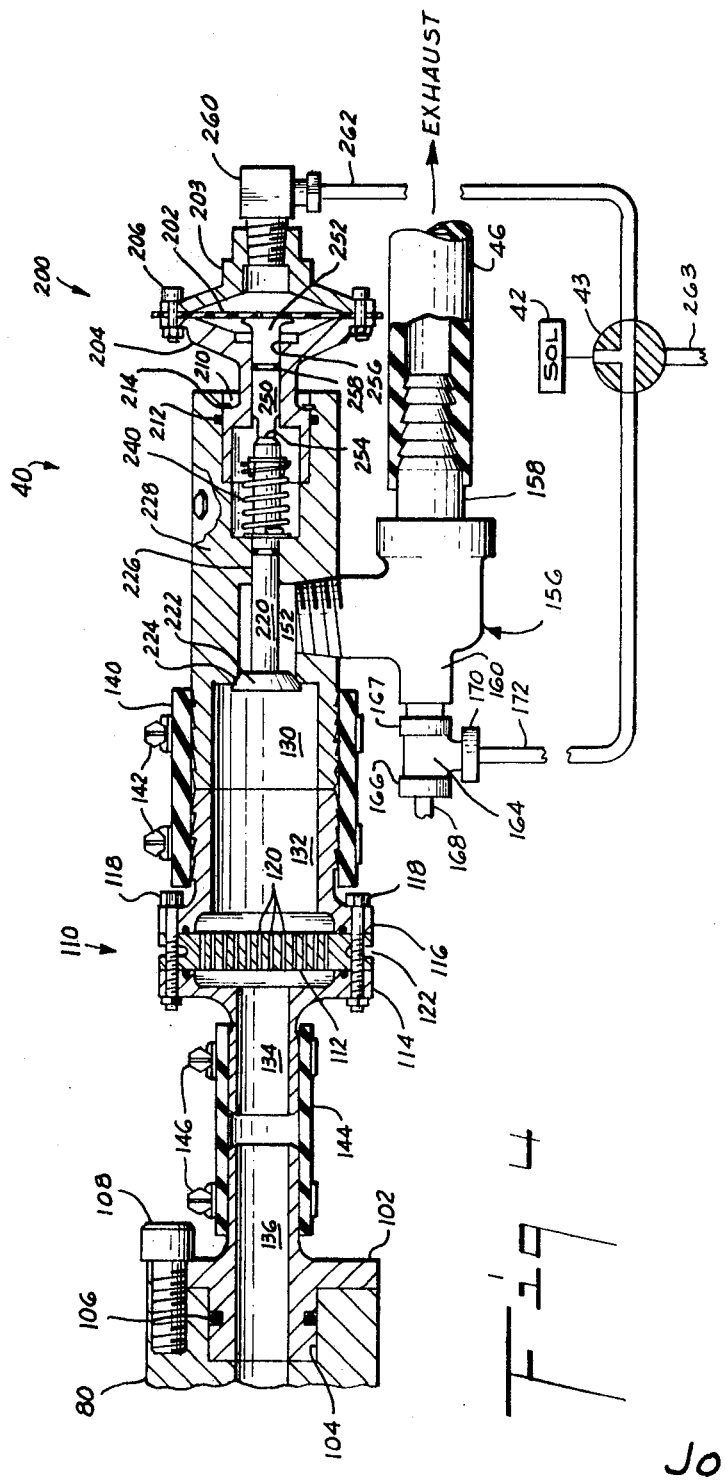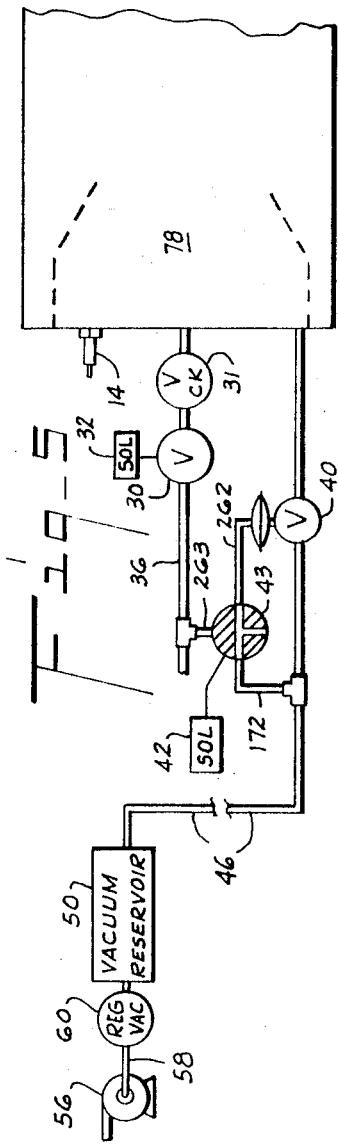

3,592,287

EXHAUST VALVE SYSTEM FOR SEISMIC GAS EXPLODER APPARATUS

BACKGROUND OF THE INVENTION

In seismic exploration, the use of impulses for the study of the earth's substrata is well known and generally depends on the generation of suitable seismic disturbances at or near the earth's outer surface or in water by some suitable means. A portion of the seismic impulse or disturbance travels downwardly through the earth until it encounters a subsurface discontinuity, such as an interface between strata. The interface causes a reflection of at least a portion of the seismic energy back toward the outer surface of the earth. Suitable detection devices such as geophones and hydrophones, positioned in the vicinity of the generated seismic disturbances detect the reflected seismic wave energy. Since the time of initiation of the seismic impulses is known, by measuring the time intervals between the initiation of the seismic impulses and the reception of the reflected energies, at each of many detection stations, it is possible to establish a record from which a geologist may obtain helpful information concerning the nature and structure of the underlying earth's subsurfaces.

Several seismic impulse generators and methods are known. To name only a few: the so-called "shot hole" method wherein a shot hole is drilled into the ground and a suitable explosive charge is detonated within the shot hole to generate the desired seismic impulses; the so-called "weight drop method" wherein a large mass is periodically dropped; and the "explosion method."

According to the explosion method the seismic impulse is generated by the explosion of a suitable explosive charge, such as a mixture of propane and oxygen within an explosion chamber. It is desired, of course, from such gas exploders to obtain a relatively sharp rising output pulse as well as optimum efficiency. A limiting factor in obtaining optimum operating efficiency as well as pulse shape is attributed to the inherent limitations of mechanically operated exhaust valves. Such exhaust valves ordinarily have a preset spring tension. An untimely opening of an exhaust valve causes leakage of combustible gases, improper firing synchronization, bouncing, loss of output energy, etc.

Another difficulty encountered especially in marine seismic exploders is caused by the fact that the purging of the products of combustion in each combustion cycle is to a great extent dependent upon the water pressure at the depth of "shooting." In relatively deep waters the sea water head is adequate. In shallow waters, however, the head is insufficient to cause a complete purging of the products of combustion. When a fresh charge of combustible gases is admitted into a volume containing residue noncombustible products, improper intergas mixing results, and the wave shapes of the output seismic signals rapidly deteriorate. Since the energy source is a most important factor in obtaining good seismic records, the significance of the above-described and other drawbacks will become readily apparent.

Yet another difficulty encountered with some prior art gas exploders is ascribed to the fact that during the condensation of the products of combustion there is such a rapid pressure collapse that in addition to the desired main output pulse secondary undesirable pulses become generated. With mechanically operated exhaust valves, it was rather difficult to obtain consistent and uniform output impulses from a plurality of gas exploders operated simultaneously. Another problem is encountered with marine gas exploders in that they depend upon the outside water pressure surrounding the exploder for compressing the combustion chamber to expel therefrom the products of combustion. This makes the operation of the exploder dependent upon the depth of shooting. In relatively deep waters the operation is satisfactory, whereas in relatively shallow waters the operation becomes unreliable, inefficient and sometimes even erratic.

Another serious limitation of some prior art marine gas exploders is due to the fact that, after the mechanically operated exhaust valve is set to open at a particular pressure differential, no variations in the prefiring pressure is possible without readjusting the spring tension in the exhaust valve. In the field such readjustments are very time consuming, expensive, and seriously slow down the progress of the seismic exploration crew.

SUMMARY OF THE INVENTION

Briefly, the present invention employs, in connection with conventional gas exploders a remotely controlled, pilot-operated exhaust valve which is controlled by the gas pressure in the fuel system and which allows the products of combustion to purge into a vacuum operated chamber. In order to obtain variable preignition levels and to allow substantially all of the products of combustion to escape after each explosion into the vacuum chamber, the timing operation of the exhaust valve is suitably programmed. In this fashion the efficiency of operation is increased and greater seismic impulses can be obtained. To avoid generating undesirable secondary seismic pulses, the gas products of combustion are kept inside the combustion chamber for a longer time period and allowed to act as an air cushion thereby decreasing the motion of the extensible walls of the combustion chamber.

Accordingly, it is a principal object of the present invention to provide an improved seismic gas exploder apparatus.

A further object of the present invention is to provide an improved seismic wave generating device wherein increased compression of the combustible charge prior to ignition is readily obtainable.

Another object of the present invention is to provide an improved seismic wave generating device wherein the generation of undesirable secondary seismic impulses is substantially eliminated.

Yet a further object of the present invention is to provide an improved gas exploder apparatus which readily lends itself for simultaneous operation with other such exploders.

Still another object of the present invention is to provide an improved gas exploder which substantially eliminates the described and other drawbacks of conventional seismic gas exploders and which operates efficiently throughout a relatively great range of variations in surrounding environmental conditions and in levels of underwater operations.

Another object of the present invention is to provide a gas exploder apparatus capable of selectively producing higher energy seismic impulses.

A very important object of this invention is to provide a gas exploder apparatus which is especially adapted for generating seismic impulses in very shallow waters.

Other objects will become apparent from the following detailed description and by reference to the accompanying drawings. It should be understood, however, that the detailed description is given by way of illustration only, since various changes and modifications falling within the spirit and scope of the invention will readily become apparent to those skilled in the art.

BRIEF DESCRIPTION OF THE DRAWINGS

FIG. 1 is a block diagram representation of a seismic gas exploder system embodying the present invention;

FIG. 2 is a cross-sectional view of a preferred gas exploder apparatus which is especially adapted for use in connection with the system shown in FIG. 1;

FIG. 3 is a pressure-time diagram of the pressure in the combustion chamber in the apparatus shown in FIG. 2;

FIG. 4 is a view partly in cross section and partly in perspective of a preferred exhaust valve arrangement, including a flame arrester, used in connection with the gas exploder shown in FIG. 2; and FIG. 5 is a schematic representation of the operation of FIG. 4.

Referring now to FIG. 1 of the drawings, a seismic pulse generating apparatus is generally indicated by the reference character 10. The apparatus may be any suitable conventional seismic gas exploder such as the Aquapulse (a trademark of Western Geophysical Company of America) the Dinoseis (a trademark of Sinclair Corporation) and others. Conventional gas exploders are well described in the technical and patent literature. Any such gas exploder typically includes a variable volume combustion chamber which is represented by dotted lines 12 inside exploder 10. A pressurized fuel or fuel mixture is introduced into combustion chamber 12 which is provided with one or more spark plugs 14 threadedly mounted in a wall of the firing chamber. The spark plug 14 is connected through a lead wire 16 to a suitable source of electric energy forming part of a power and timing control unit 18.

An intake valve 20 is actuated by a solenoid 22 which is energized through a lead wire 24 by the power unit 18. Valve 20 controls the intake of fuel gases such as propane from a propane supply 26 feeding into a line 28.

Another intake valve 30 is operated by a solenoid 32 which is energized through a lead wire 34 connected to the power and timing control unit 18. Valve 30 controls the intake of oxygen from a line 36 coupled to an oxygen source 38.

Chamber 12 is also provided with a pilot-operated exhaust valve 40. The pilot control line 41 is supplied with pressure from the oxygen line 36 through a three-way valve 43 actuated by a solenoid 42 which is controlled by a lead wire 44 connected to the power and timing control unit 18. Valve 40 leads the exhaust gases through a line 46 into a vacuum chamber or reservoir 50. Valve 43 interconnects pilot control line 41 with a pilot bleed line 45 connected to exhaust line 46. The valves are suitably mounted on an end wall 52 forming part of or connected to the gas exploder apparatus 10. The various gas lines 28, 36 and 46 as well as the electric wires 16, 34, and 44 are suitably grouped into a cylindrical resilient pipe or other housing 54 which extends them to the reservoir 50, gas sources 26 and 38 and power and timing control unit 18. The vacuum reservoir 50 is driven by a vacuum pump 56 connected to the reservoir 50 through a line 58 and a vacuum regulator 60. Elements 56, 60, 50, 38, 26, and 18 are all shown enclosed by dotted lines in a volume 62 typically located on deck of a seismic boat (not shown).

For a better understanding of this invention reference is made to FIG. 2 wherein an Aquapulse apparatus generally designated by reference character 70 is shown. Source 70 includes a resilient, stretchable sleeve or boot 72 fixedly clamped onto a front end seal 74 and a back end seal 76 by clamps 75, 77 respectively. A horn-shaped firing chamber 78 terminates in an end wall 80 to which are connected the inlet valves 20, 30, the exhaust valve 40 and the spark plug 14. Other elements may be connected to the end wall 80 for monitoring the conditions within the firing chamber 78. A cover housing 82 removably secured to end wall 80 encloses the spark plug and the inlet and exhaust valves as shown.

A passage 84 is formed between the inner wall of seal 74 and the outer wall of firing chamber 78 to allow water to enter into a plurality of water carrying cooling tubes 88 extending between end seals 74 and 76. The inner volume of sleeve 72 forms the expansion combustion chamber 12. Access to the expansion chamber 12 from the firing chamber 78 is provided by a circular opening 92 in the mouth 94 of the firing chamber 78 which extends only a short distance past its joint with the front end seal 74.

As previously described, the exhaust valve 40 is connected through line 46 to the remotely positioned vacuum reservoir 50 which may be of any convenient shape. Reservoir 50 is made to have a wall thickness sufficient to withstand the external pressures acting thereon and to have an inner volume adequate to properly accommodate after each cycle of operation the exhaust products and gases of combustion from the expansion chamber 12 without raising significantly its internal pressure. Line 46 can be of substantially reduced diameter say on the order of one-half to 1 inch diameter instead of 4 to 6 inches previously required in similar prior art apparatus.

In practice, several exploder sources 70 are operated simultaneously. Chamber 50 may receive the exhaust from one or several such exploders. In the preferred embodiment, however, each exploder is provided with at least one reservoir 50 so that if any one individual exhaust system becomes defective, it will be convenient to identify and rapidly isolate the defective exploder. A drain valve 51 is provided for draining any liquid which may be formed in reservoir 50. The vacuum pump 56 is of the fast-acting type. It may continuously operate to maintain a continuous vacuum is reservoir 50 through regulator 60. Both regulator 60 and pump 56 are of conventional design and are available commercially.

It will be appreciated that between the atmosphere and the exhaust valve 40 are now interposed elements 56, 60 and 50 which makes the exhaust system a so-called "closed" system, in contradistinction to the so-called "open" system, wherein the exhaust pipe 46 must have a relatively large diameter to avoid back pressures, and is sufficiently long to discharge the products of combustion directly to the atmosphere. In the "open" exhaust system, water enters through the exhaust pipe 46 and corrodes the internal parts of valve 40 itself as well as the inside walls of the firing chamber 78 thereby causing misfiring, leakage of exploded gases, and damage to the exploder itself. The solenoid-operated valves 20 and 30 allow a pressured supply of fuel to enter into the expansion chamber 12 and prevent any exhaust gases from entering the feed lines 28, 36 when the combustion chamber 12 is being purged. The solenoid-pilot-operated valve 40 is controlled and programmed in such a manner that valve 40 is closed when the combustion chamber is being charged an opened when the combustion chamber is being purged of the exhaust gases. The energization of the spark plug 14 and of the solenoids 22, 32 and 42 is controlled by the control unit 18 which includes means well known in the art, and no detailed description thereof is believed to be necessary. Thus, the times of ignition of the fuel within chamber 12 and of the solenoids are all coordinated so as to insure proper operation of the gas exploder.

It will be understood that since the energy source 70 is a marine seismic gas exploder which is placed under water and towed by a cable (not shown) from a ship, the hydrostatic water head above source 70 helps to compress the fuel mixture when the pressurized gases enter the combustion chamber during the fueling phase and additionally helps to purge the exhaust gases from the combustion chamber 12 during the exhaust phase of the cycle.

In operation, the apparatus 70 is located under water and is trailed by a boat. At the start of the "shooting" cycle, exhaust valve 40 is closed, solenoid-operated inlet valves 20 and 30 are open which permit pressurized propane and oxygen to enter the combustion chamber 12. After the combustion chamber has been charged with a predetermined charge, the valves 20, 30 connecting the intake lines 28, 36 are turned off. The spark plug 14 is then energized to ignite the fuel mixture within the combustion chamber 12. The resultant explosion causes the stretchable boot 72 to expand and assume an enlarged volume as represented by the dotted lines 13. The rapid expansion of boot 72 results in an acoustic wave creating the desired seismic impulse. The reflections of the seismic impulses from the different strata in the earth are detected by a hydrophone streamer cable (not shown) and recorded in digital and/or analog apparatus.

With particular reference to FIG. 3, just prior to the opening of inlet valves 20 and 30, that is, just prior to $T_0$, the pressure inside the firing chamber 78 and expansion chamber 12 is at its lowest level and is below atmospheric pressure. At $T_0$ the exhaust valve 40 is closed and valves 20 and 30 are opened to introduce a fresh charge of combustible gases and to allow the pressure inside the expansion chamber 40 to gradually increase until, at a time $T_1$, it reaches its predetermined prefiring pressure level which can be above or below atmospheric pressure. Since the time of opening of exhaust valve 40 can now be remotely controlled, the prefiring pressure level can be varied by varying the pressure in each of the gas sources 26 and 38.

At a time $T_2$ the ignition pulse is applied through wire 16 which ignites the combustible charge in firing chamber 78. The combustion spreads throughout the entire combustion chamber 12 very rapidly. From time $T_2$ to a time $T_3$ (on the order of a few milliseconds) there is a sharp pressure rise inside the expansion chamber 12 which rapidly collapses because of cooling water circulating through pipes 88. At a time $T_4$ the exhaust valve 40 is caused to open by energizing (or deenergizing) solenoid 42. A purging of the products of combustion through the exhaust valve 40 and line 46 rapidly takes place. The outside hydrostatic pressure head surrounding the apparatus 70 assists in the purging process. By using a remotely controllable valve 40, the valve can be selectively maintained open for variable periods of time, hence better purging of the products of combustion can be achieved. Greater efficiency of operation as well as greater uniformity in the generated seismic impulses are thereby obtained.

It will be appreciated that the fuel lines 28, 36 now supply fuel and oxidizer gases, at the beginning of each cycle, into an evacuated combustion chamber 12 which results in even greater intermixing between the gases, that the vacuum-controlled exhaust system allows control over the amount of contaminated gases left in the chamber 12 at the end of each cycle, that the timing apparatus in control unit 18 allows control over the operation of the exhaust valve 40 with adjustable time intervals to obtain more uniform seismic impulses thereby improving the overall efficiency of the seismic system, and that by intentionally delaying the opening of exhaust valve 40, the entrapped exhaust gases in chamber 12 act as an air cushion to prevent a too-rapid collapse of boot 72 and hence the generation of secondary undesirable impulses.

Referring to FIG. 4 there is shown a preferred pilot-operated exhaust valve 40, the operation which is initiated by the three-way solenoid-operated valve 43 controlled by the solenoid 42, and the manner of interconnecting valve 40 both to the gas exploder 10 and to the exhaust line 46.

Coupled to the end wall 80 of the firing chamber 78 is an exhaust coupler 102 fitting inside a recess 104 within the end wall 80. Coupler 102 is sealed off by an O-ring 106 and is bolted to wall 80 by volts 108. A flame arrester 110 made of a suitable refractory disc-shaped material 112 is sandwiched between two couplers 114 and 116. Couplers 114, 116 are secured to each other as by bolts 118. The refractory disc 112 is provided with a plurality of perforations 120 extending between the outer flat faces of the disc. The outer cylindrical wall of disc 112 is provided with a deep groove 122 to allow water to penetrate therein.

The exhaust valve 40 is preferably made of stainless steel in cylindrical form. Valve 40, couplers 116, 114 and 102 define, respectively, exhaust chambers 130, 132, 134, and 136, all in longitudinal axial alignment. Valve 40 is coupled to coupler 116 by a resilient hose 140 and clamps 142. Similarly couplers 102 and 114 are interconnected by a resilient rubber sleeve 144 and clamps 146.

Exhaust chamber 130 communicates with an inner chamber 152 which extends to the outside of valve 40 through a threaded T-fitting 156 having a right arm 158 and a left arm 160. Arm 158 is coupled to the exhaust line 46. To arm 160 is connected a T-fitting 164, one leg 166 of which is connected to a siphon tube 168 for draining the liquid products of combustion out of the gas exploder 10, in a manner described in U.S. Pat. No. 3,509,962, assigned to the same assignee. A second leg 167 of fitting 164 is connected to shoulder 160, and the third leg 170 is connected to an exhaust hose 172.

A diaphragm assembly generally designated as 200 is provided. It includes a resilient diaphragm 202 sandwiched between a right-hand housing 203 and a left-hand housing 204. Housings 203 and 204 are interconnected by bolts 206. The left-hand housing 204 fits snugly inside a recess 210 in valve 40 and is hermetically sealed therefrom by an O-ring 212 and secured therein by a snap ring 214.

A spring-biased valve stem 220 in valve 40 terminates in a valve head 222 which operatively engages a valve seat 224. Stem 220 slides inside a cylindrical opening 226 formed in a central shoulder 228. The right end of stem 220 is spring biased by a spring 240 to normally cause the valve head 222 to rest against its seat 224 thereby sealing off gas communication between the exhaust line 46 and the combustion chamber 12.

To actuate the valve stem 220 there is provided a plunger 250 having a head 252 resting against the diaphragm 202 and an actuator tip 254 adjacently disposed to the right end of stem 220. Plunger 250 slides inside a center opening 256 and is provided with an O-ring 258. An L-fitting 260 couples a hose 262 with the inner chamber defined by housing 203. Hose 262 is connected to hose 172 and to an oxygen line 263, branching off from oxygen supply line 36, through the three-way valve 43 controlled by a solenoid 42. Valve 43 normally provides communication between hoses 262 and 172 except when the solenoid becomes actuated. Then the communication between hoses 262 and 172 is broken and communication between hoses 262 and 263 is established. When solenoid 42 is deenergized, communication between lines 262 and 172 is again reestablished.

The operation of the exhaust system is schematically illustrated in FIG. 5. During the fill cycle, valve 40 is closed and inlet valve 30 is opened thereby allowing oxygen from line 36 to enter into the firing chamber 78 through a check valve 31. Valve 30 is closed when spark plug 14 is ignited. After the explosion solenoid 42 becomes actuated to break the communication between lines 172 and 262 and to establish gas communication between lines 263 and 262. The pressure in the oxygen line which is typically on the order of 50 to 70 p.s.i. becomes exerted against the diaphragm 202 causing plunger 250 to actuate stem valve 220 thereby unseating valve head 222 from its seat 224. The unseating of valve head 222 allows communication to become established between chambers 136, 134, 132, 130, 152 and exhaust line 46. Thus, when valve 40 becomes open by the pilot pressure from the oxygen line 36, the gaseous products of combustion are allowed to exhaust through exhaust line 46 into the vacuum-operated reservoir 50 operated by the vacuum pump 56.

Upon completion of the exhaust cycle the solenoid 42 is deenergized to cause the three-way valve 43 to break communication between lines 263 and 262 and to allow the back pressure on the diaphragm 202 in housing 203 to bleed off into the vacuum line 46, by establishing communication between lines 262 and 172. The removal of the pressure from line 262 allows spring 240 to close the valve 40 by seating valve head 222 against its seat 224. The diaphragm assembly 200 is now ready for another charge of oxygen to actuate its diaphragm 202.

The flames from the firing chamber 78 become arrested by the flame arrester 110 which is cooled by the surrounding water and by the water in groove 122.

It was found, when using a conventional mechanically operated exhaust valve in connection with the marine seismic apparatus 70, instead of the gas-pilot-operated valve 40 in accordance with this invention, that after ignition the rise in pressure in the expansion chamber 12 would unseat the valve control element somewhat prematurely thereby allowing the stretchable sleeve 72 to very rapidly collapse against the water carrying tubes 88. It is theorized that the almost sudden collapse of sleeve 72 creates an external vacuum in the water in the volume defined between the dotted lines 13 representing the position of sleeve 72 during maximum expansion and dotted lines 15 representing the minimum position of sleeve 72 during contraction. It is anticipated that a minor implosion may take place, i.e., outside water rushes into the void created by the very rapid collapse of sleeve 72 thereby generating an implosion impulse which results in an undesirable secondary seismic impulse, immediately after the desired primary seismic impulse.

By suitably delaying the opening of the exhaust valve 40, the exhaust gas products of combustion are entrapped in the explosion chamber 12 and are used to serve as a cushion for resisting the sudden collapse of sleeve 72 and for preventing the generation of undesirable secondary seismic impulses.

While the preferred form of the invention has been shown and described, it is to be understood that all suitable modifications and equivalents may be resorted to which fall within the scope of the invention as claimed.

What I claim is:

1. A gas exploder system for generating pulses of energy including:

a housing, said housing having inner walls defining at least a combustion chamber assembly, means to supply to said combustion chamber at least one gas under pressure to form a combustible mixture, means to ignite said combustible mixture within said housing thereby producing gaseous products of combustion, vacuum-operated exhaust means operatively coupled to said housing and arranged to purge said gaseous products of combustion from said housing, said vacuum-operated exhaust means including a remotely controllable exhaust valve operatively coupled to said housing, and said exhaust valve being actuated by said gas under pressure.

2. The exploder system of claim 1 wherein:

said exhaust means further includes a vacuum chamber, and vacuum-creating means coupled to said vacuum chamber for maintaining a predetermined vacuum throughout said exhaust means.

3. The gas exploder system of claim 2 wherein:

said vacuum-creating means includes a vacuum pump, said vacuum chamber and said pump are positioned at a relatively remote location from said housing, and coupling means including a flexible hose for coupling said vacuum chamber to said housing.

4. The gas exploder system of claim 3 wherein:

said combustion chamber assembly includes an elastic inflatable member, and said inflatable member covering at least a portion of the surface of said assembly.

5. The gas exploder system of claim 4 and further includes a firing chamber in said housing communicating with said combustion chamber for receiving said gas thereby inflating said elastic inflatable member.

6. The gas exploder system of claim 5 wherein:

said exhaust valve is remotely actuated at time intervals selected to allow said products of combustion to accumulate within said combustion chamber thereby avoiding the generation of undesirable secondary pulses of energy caused by the rapid deflation of said inflated member.

7. A gas exploder system for generating pulses of energy including:

a housing, said housing having walls defining at least a combustion chamber assembly, gas supply means to supply to said combustion chamber at least one gas under pressure to form a combustible mixture, means to ignite said combustible mixture within said housing thereby producing gaseous products of combustion, vacuum-operated exhaust means operatively coupled to said housing and arranged to purge said gaseous products of combustion from said housing, and said vacuum-operated exhaust means including a controllable exhaust valve operatively coupled to said gas under pressure to actuate said exhaust valve.

8. The exploder system of claim 7 wherein:

said exhaust means further includes a vacuum chamber, and vacuum-creating means coupled to said vacuum chamber for maintaining a predetermined vacuum throughout said exhaust means.

9. The gas exploder system of claim 8 wherein:

said vacuum-creating means includes a vacuum pump, and coupling means for coupling said vacuum chamber to said exhaust valve.

10. The gas exploder system of claim 9 wherein:

said combustion chamber assembly includes an elastic inflatable member, and said inflatable member covering at least a portion of the surface of said assembly.

11. The gas exploder of claim 7 and further including an electrically operated valve operatively coupled between said gas supply means and said exhaust valve for selectively controlling the application of said gas under pressure to said exhaust valve thereby actuating said exhaust valve.

12. The gas exploder of claim 11 wherein said exhaust valve includes a diaphragm assembly having a diaphragm therein, and a valve stem actuated by said diaphragm when said gas under pressure is applied against said diaphragm.

13. The gas exploder of claim 12 wherein said valve stem is spring biased to force the stem's valve head to normally rest against its valve seat thereby breaking gas communication between said combustion chamber and said vacuum-operated exhaust means.

14. The gas exploder of claim 12 wherein said electrically operated valve is a three-way valve and is solenoid operated.

15. The gas exploder of claim 14 and further including a bleed line between said three-way valve and said vacuum-operated exhaust means.

16. The gas exploder of claim 15 wherein:

said exhaust means further includes a flame arrester for arresting the flames from said combustion chamber.